Patented Oct. 14, 1924.

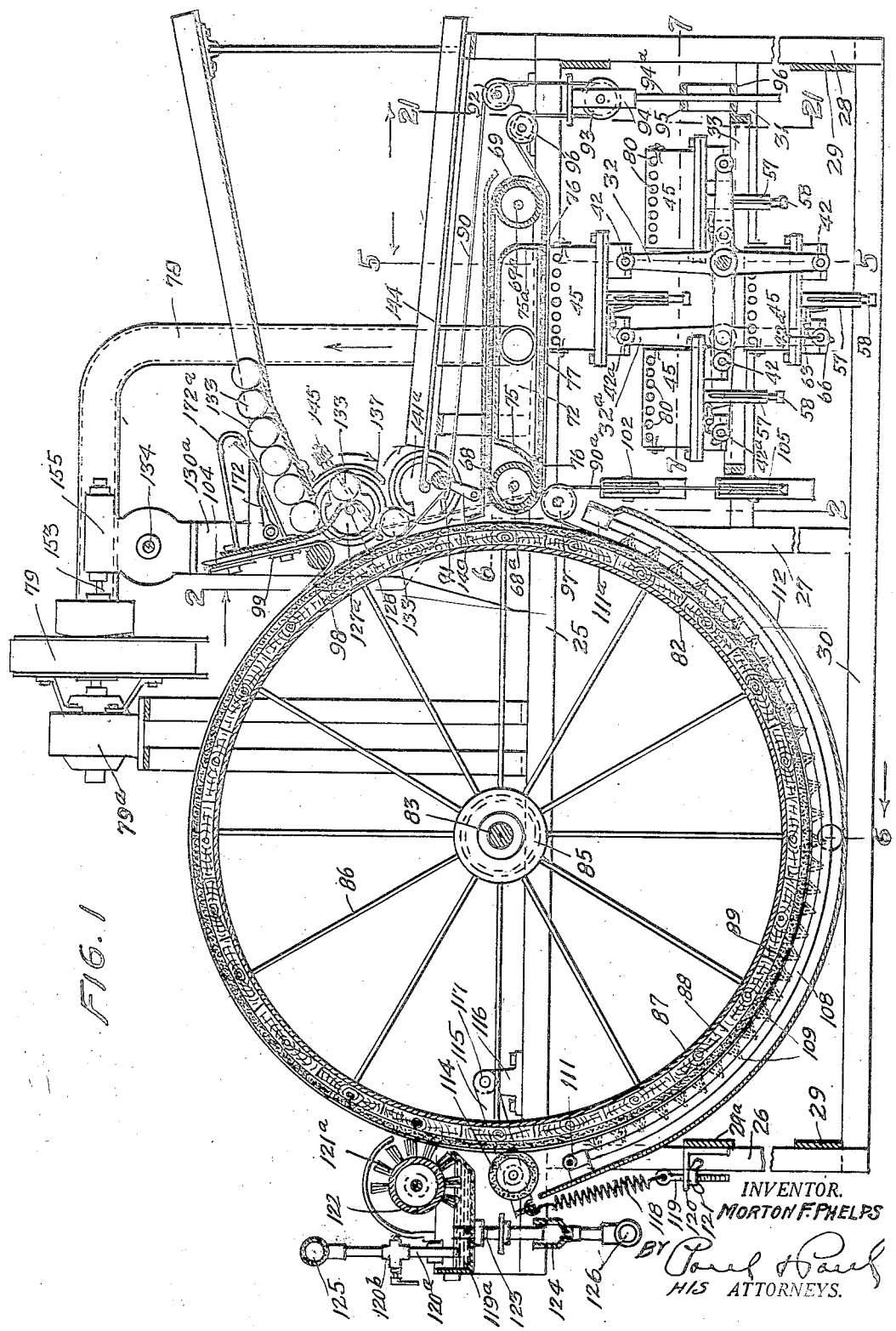

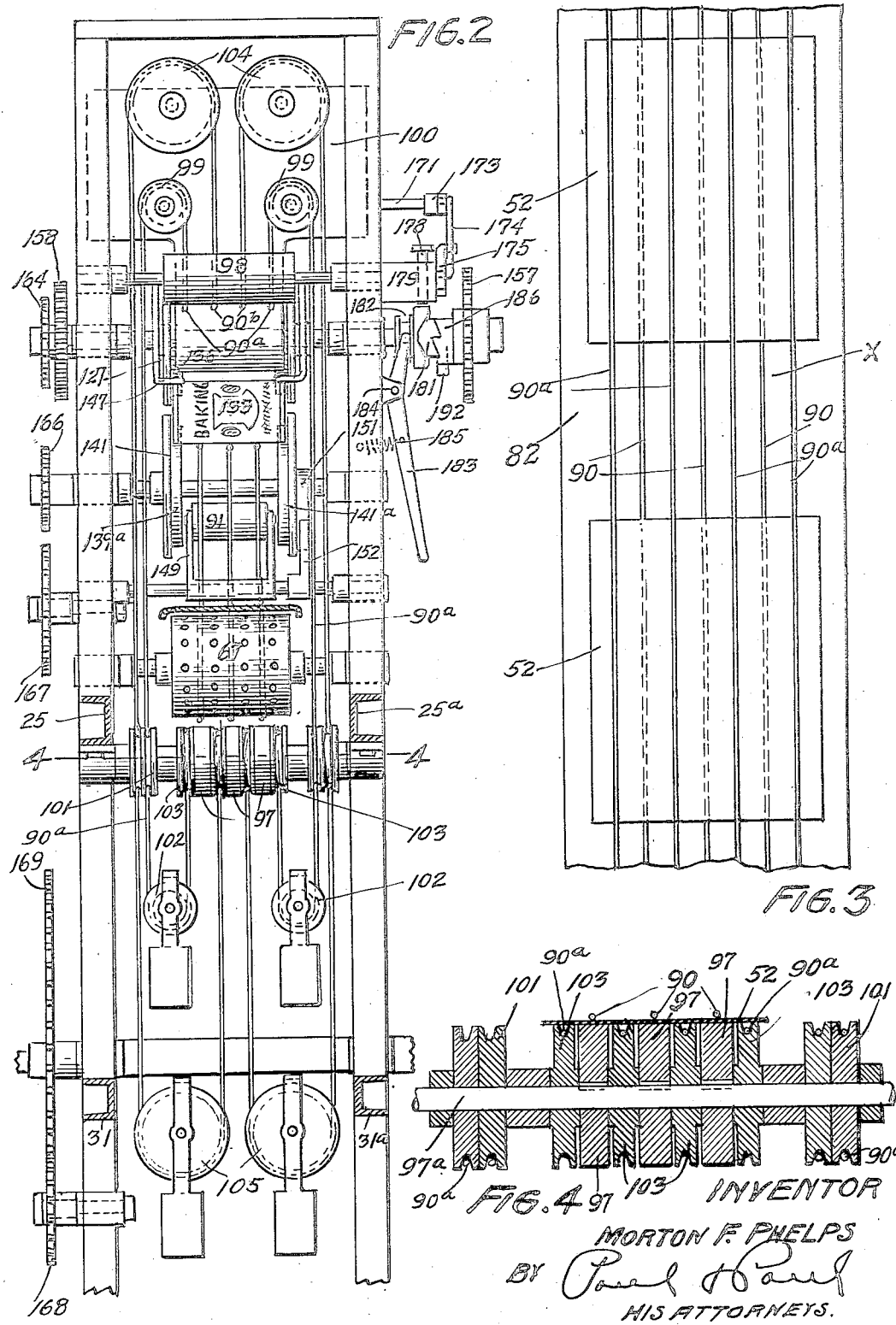

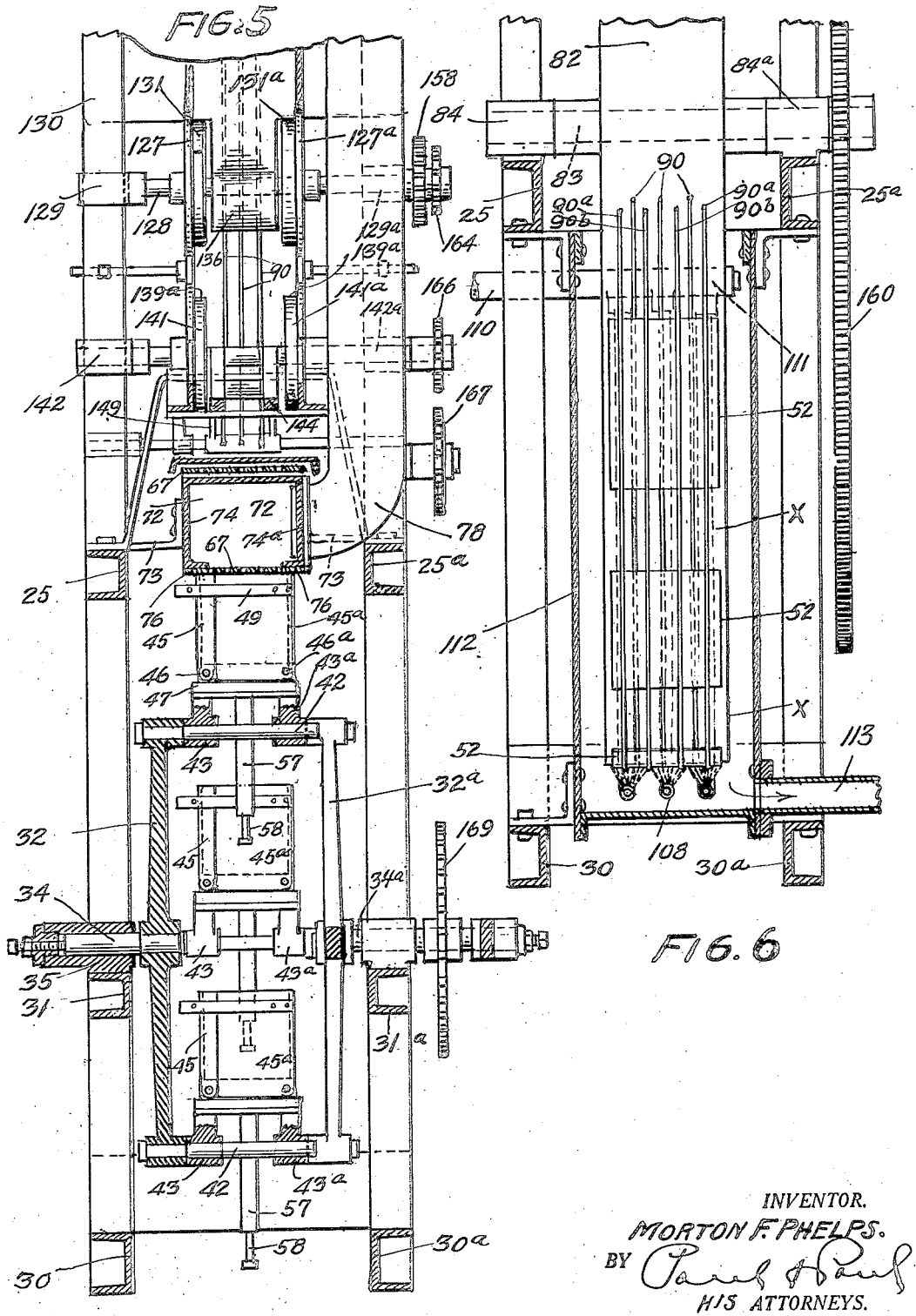

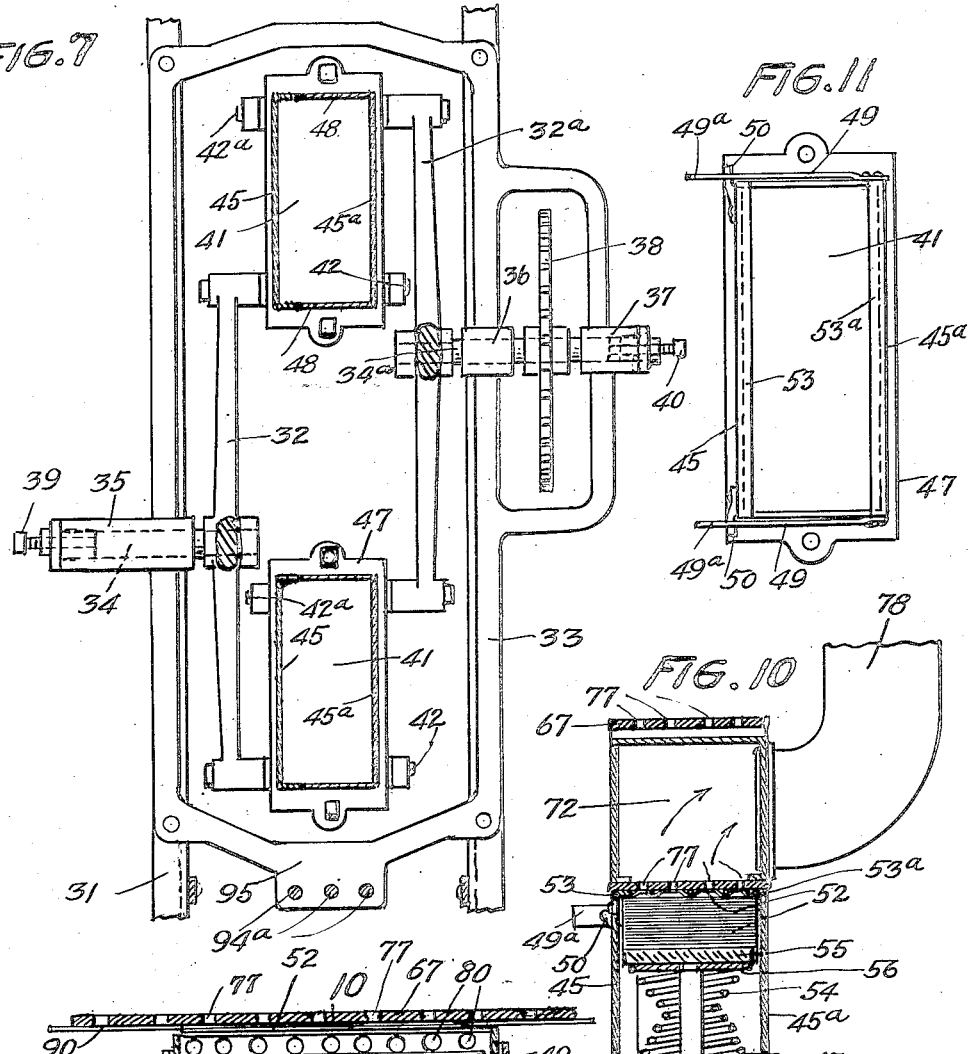
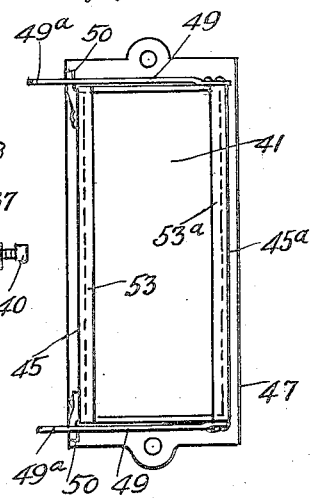
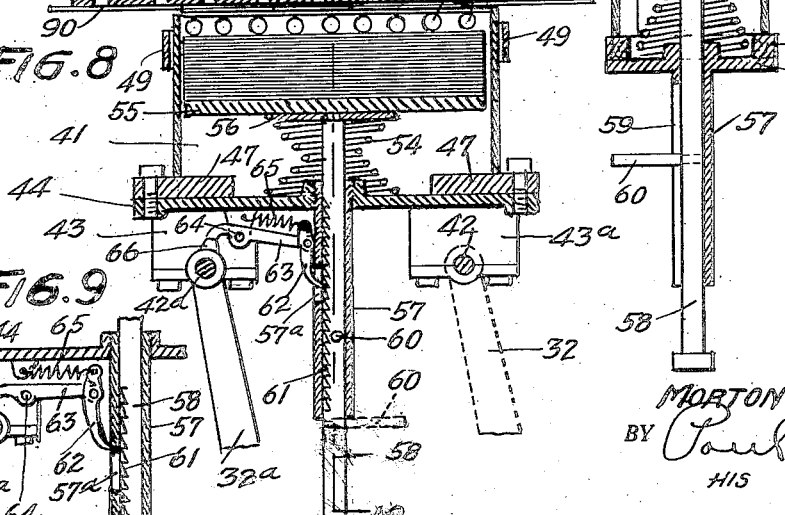
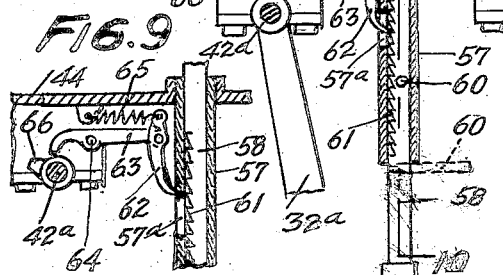

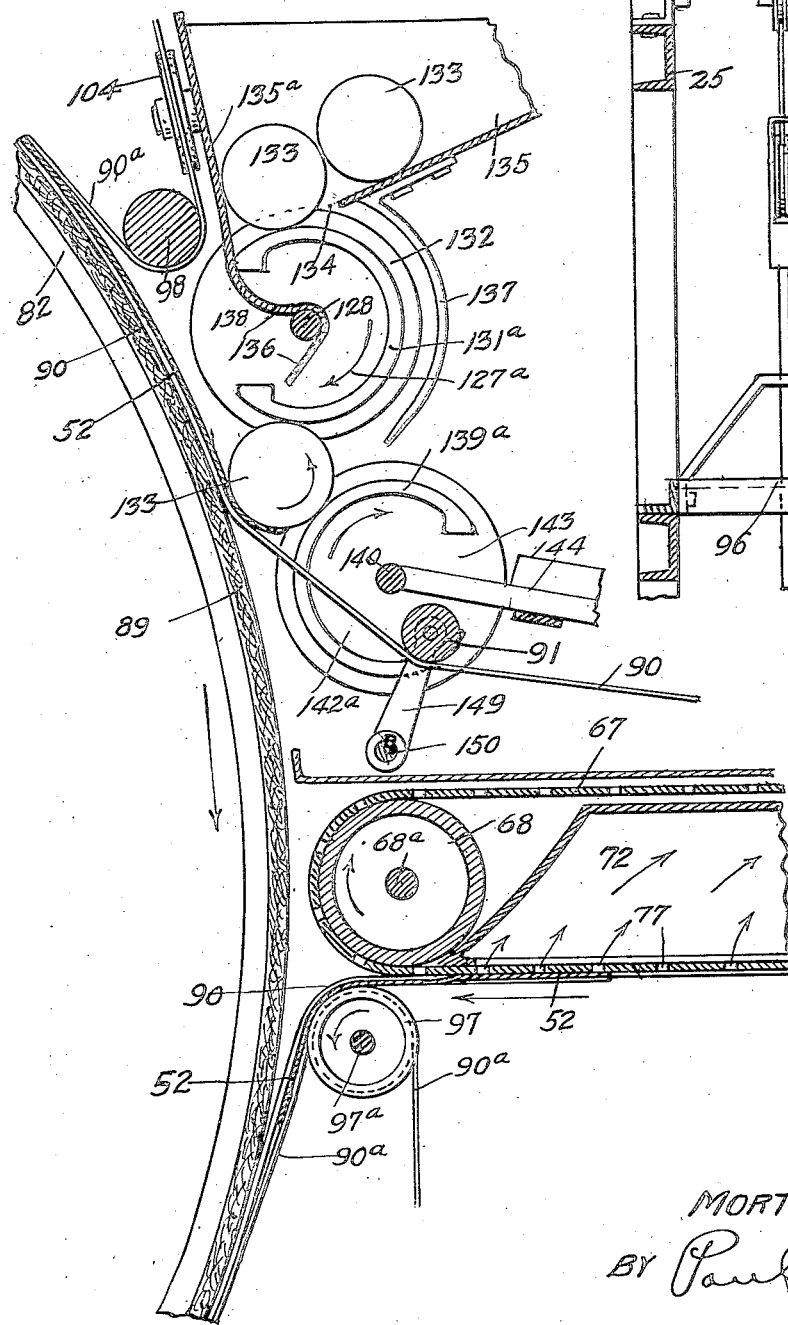
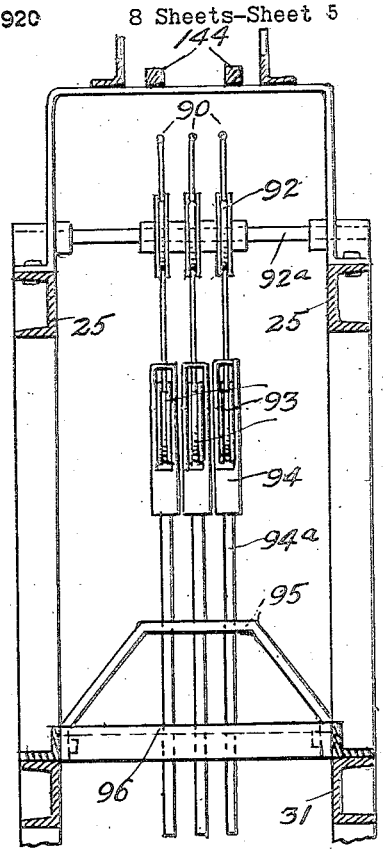

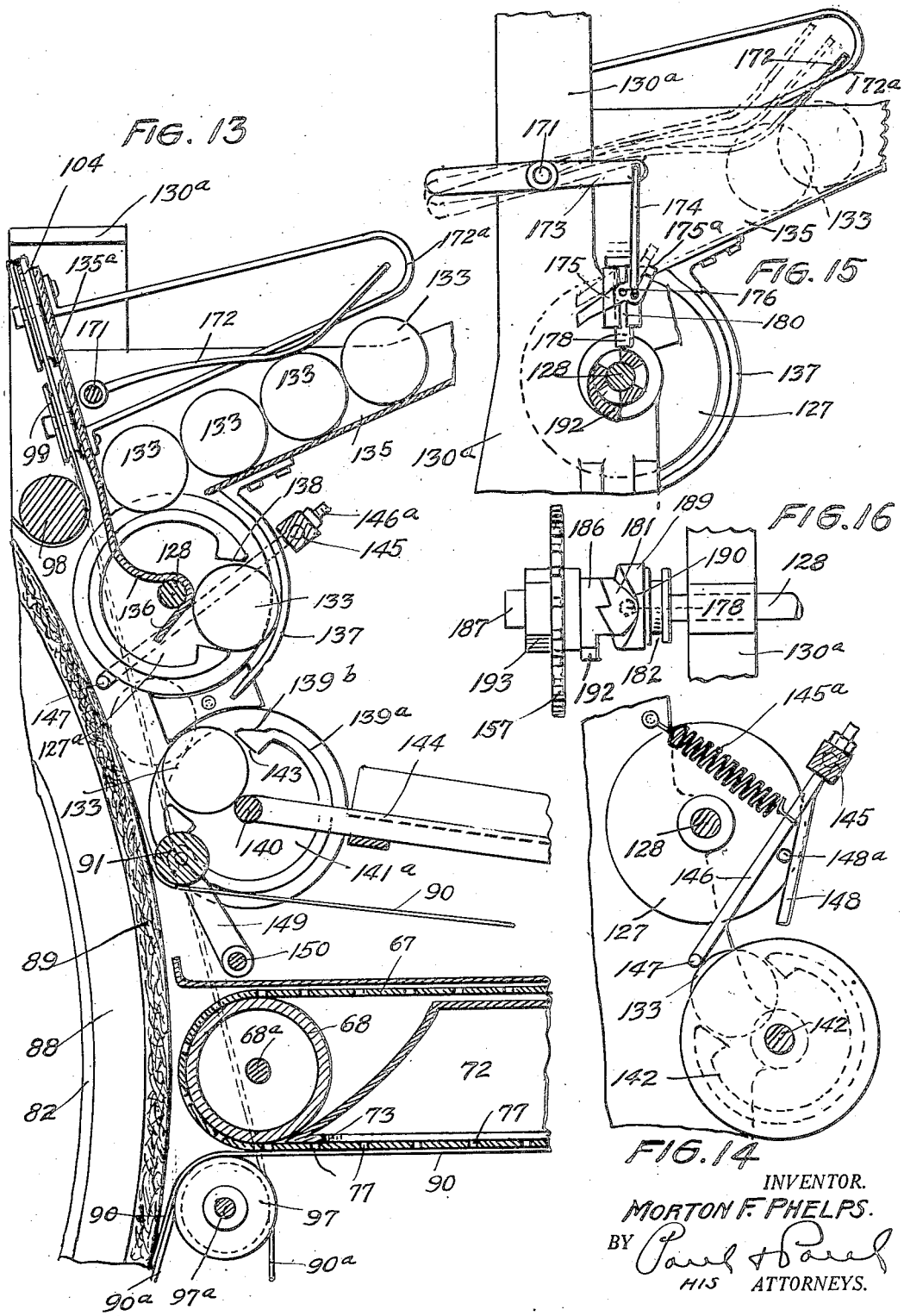

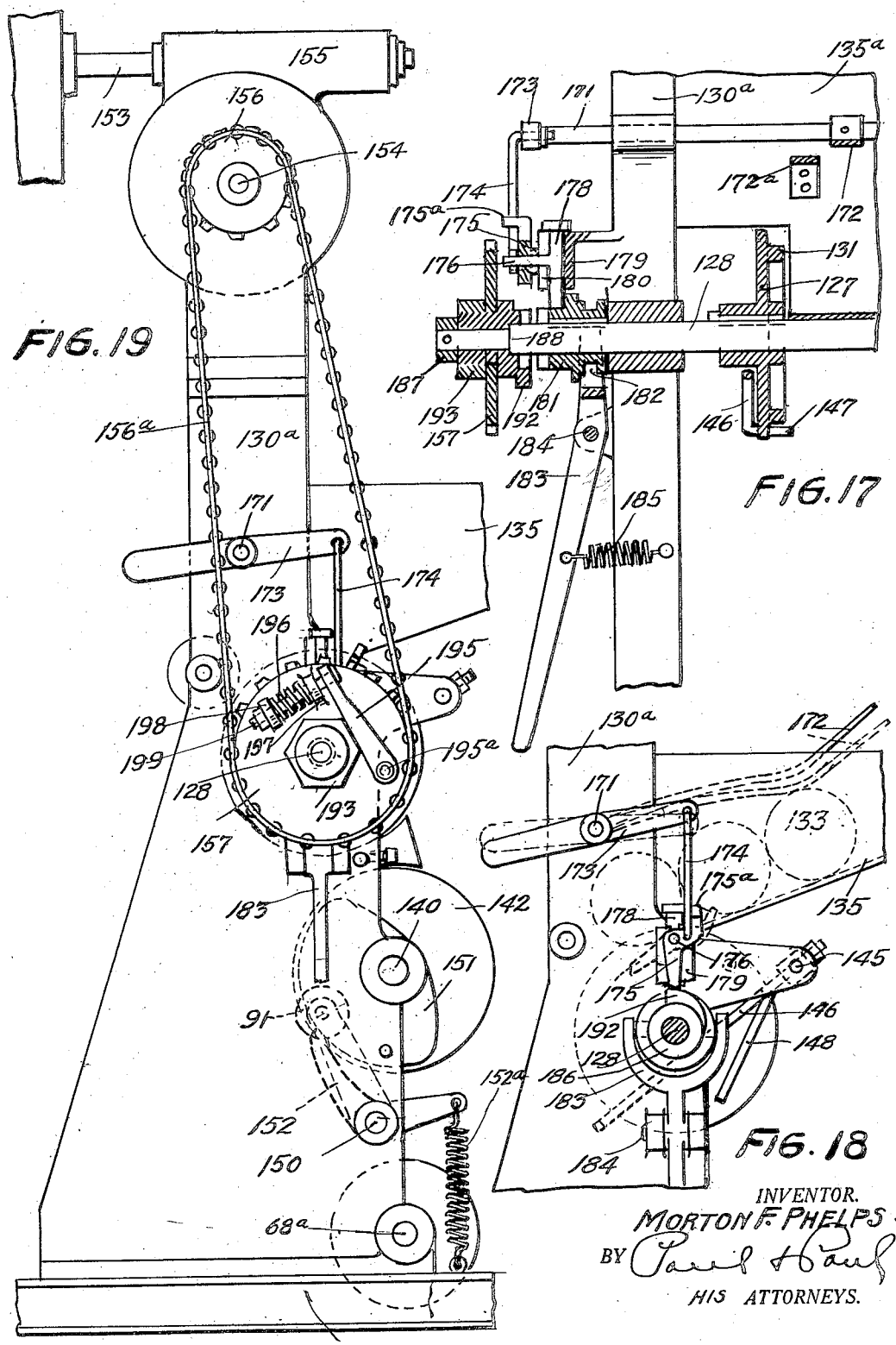

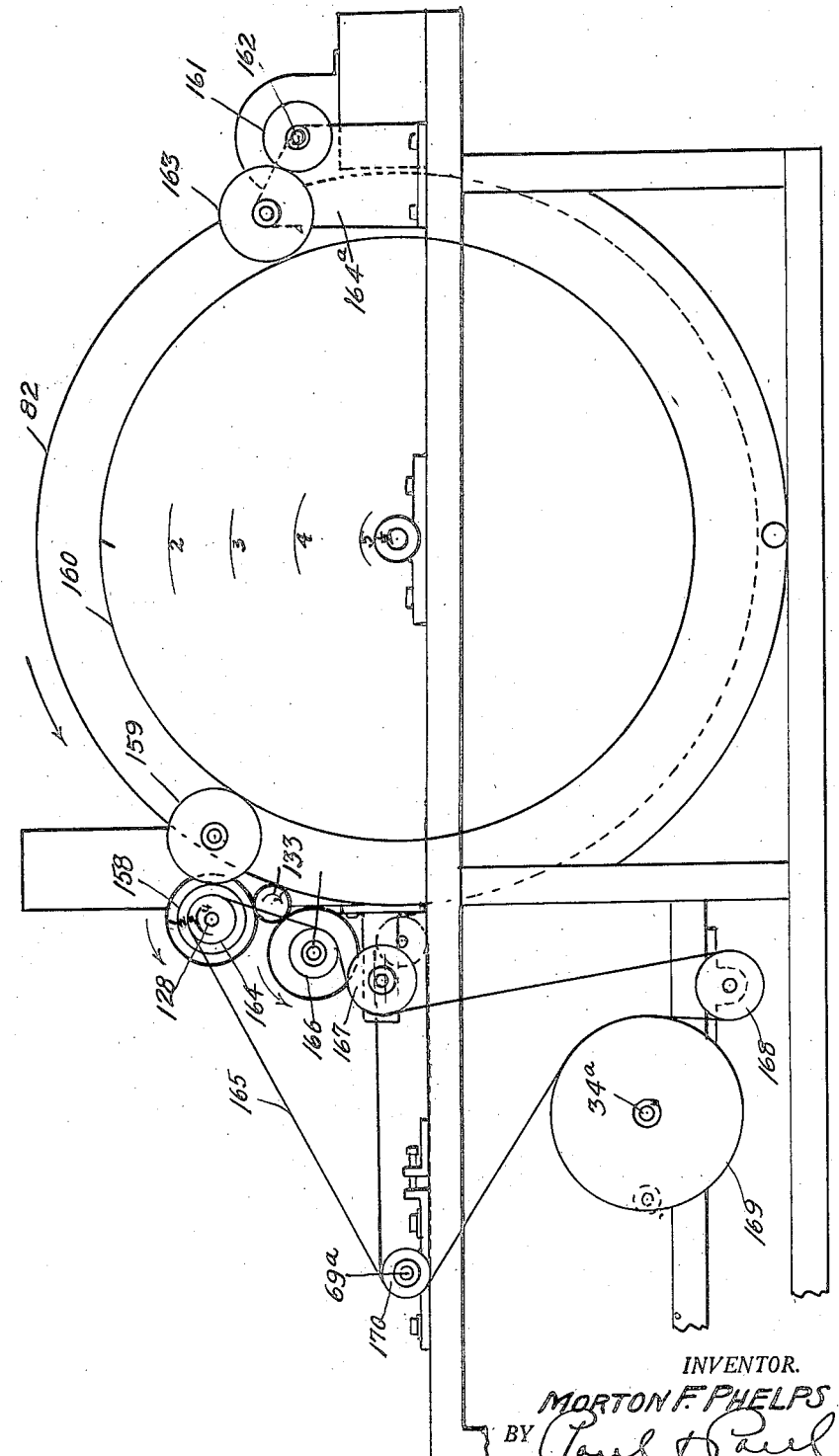

1,511,235

UNITED STATES PATENT OFFICE.

MORTON F. PHELPS, OF LITTLE ROCK, ARKANSAS, ASSIGNOR TO PHELPS MANUFACTURING COMPANY, OF LITTLE ROCK, ARKANSAS, A COPARTNERSHIP CONSISTING OF FRANK PHELPS AND MORTON F. PHELPS.

LABELING MACHINE.

Application filed September 25, 1920. Serial No. 412,665.

*To all whom it may concern:*

Be it known that I, MORTON F. PHELPS, a citizen of the United States, resident of Little Rock, county of Pulaski, State of Arkansas, have invented certain new and useful Improvements in Labeling Machines, of which the following is a specification.

My invention relates to improvements in, methods of, and machines for affixing labels to cylindrical containers, such as cans containing food stuffs, baking powder, fruit or other material and may be applied to the labeling of any solid or cylindrical body.

The general object of the invention is to provide a machine that by reason of its consruction and operation will insure the rapid, reliable and accurate affixing of the labels to the cans, will require but little attention in its operation, and be simple of construction and cheap to manufacture.

To this end the various main functions of the machine, such as feeding, carrying and affixing the labels to the cans and the feeding and discharging of the cans, are carried out by continuous rotary or endless movements of the co-operating elements, reciprocating parts or intermittent movements having been avoided in the construction and operation of the machine.

Conforming with this general construction, the invention consists more specifically in rotatable and endless operating means for feeding the labels to the machine, means for positively holding, carrying and controlling the labels continuously without intermission in their passage through the machine, means for rapidly and correctly preparing the label for fixation to the cans while being carried through the machine, means for feeding the cans to the rotary affixing elements, methods and means for positively affixing the labels around the initial contact arc of the cans, and thereafter continue it with a rolling, stretching, differential movement, means for preventing buckling or sliding of the labels in affixing the concluding and over-lapping ends, means for discharging the labeled cans from the machine, and means for positively timing and coordinating the various functions of the machine.

It further consists in means for automatically starting and stopping the machine controlled by the presence or absence of cans at the can feeding point.

The invention further consists in rapid and effective means for preparing the labels before and after the application of adhesive or paste to their surface, comprising improved means for effectually heating and impregnating the labels with fluid, preferably water, heated to near the boiling point, and rapidly and completely penetrating the body of the labels, including the colored or printed surface, and thereafter quickly stretching, drying and tempering the labels during their passage from the bath to the affixing point of the machine.

I have found that by simply applying a uniform spray of water heated to the proper degree to the blank side of the labels, a very much shorter period is required to impregnate with moisture or completely soak the body of the label and the colored matter on the opposite side thereof than if cold water is applied to the whole body of the label.

The proportion or ratio of time needed for penetration with properly heated fluid properly applied compared with cold water, has been ascertained in practice to be as much as one to one hundred, or stated differently, it requires only six seconds for properly heated water to penetrate or soak through the labels, whereas with cold water it would require ten minutes.

The heated label also has a quickening drying effect on the paste or the adhesive on the label, both before and after it is affixed to the can, thus intensifying the adhesive qualities of the paste at the time the label is applied to the can and accelerating the drying process afterwards. As a result, therefore, of this method of preparing the labels, I am enabled to operate the machine at a much higher rate of speed, the capacity or output of the machine is greatly augmented and improved results obtained.

I have also found that simply applying adhesive to the can or label and winding the label around the can is insufficient in itself to procure an accurate meeting point of both ends of the label and to uniformly attach the label over the whole body of the can, but the label must be specially prepared in its passage through the machine and stretched while being affixed to the can, and its passage and alinement to the can at the point of attachment must be positively controlled in order to avoid imperfectly affixed labels of wrinkled, irregular appearance.

My invention consists generally in various constructions and combinations, all as hereinafter described and particularly pointed out in the claims, with reference to the accompanying drawings, in which, Figure 1 is a longitudinal vertical section through a machine constructed according to my invention, with the motion transmitting means omitted, Figure 2 is a transverse vertical sectional view on the line 2—2 of Figure 1, looking in the direction of the arrow, Figure 3 is a detail section of the label carrying wheel, showing how the labels are firmly secured to the wheel by cords on both sides of the labels, Figure 4 is an enlarged detail section on the line 4—4 of Figure 2, Figure 5 is a transverse vertical section on the line 5—5 of Figure 1 on a larger scale, Figure 6 is a similar section on the line 6—6 of Figure 1, showing the spraying pipes, the carrying wheels and the labels thereon, Figure 7 is a horizontal section on the line 7—7 of Figure 1, illustrating the label feeding mechanism, Figure 8 is an enlarged sectional view through a label magazine and feeder, showing the upper magazine in a slightly advanced position from that shown in Figure 1, Figure 9 is illustrative of Figure 8, Figure 10 is a section on the line 10—10 of Figure 8, showing the label magazine in cross section in the position shown in Figure 1, Figure 11 is a plan view of one of the label magazines, Figures 12 and 13 are vertical detail sections, illustrating the can feeding and label attaching mechanism and operation, Figure 14 is a detail view, illustrating the operation of the can discharging device after the label has been affixed to the can, Figures 15, 16, 17 and 18 illustrate the clutch mechanism as controlled by the feeding of the cans to the machine, Figure 19 is a side elevation of a portion of the machine, showing a part of the drive and a safety releasing device in connection therewith, Figure 20 is a rear view of the machine, showing in diagrammatical form the preferred method of driving the working elements of the machine and obtaining the differential surface speed of the cans and label carrier, Figure 21 is a vertical cross section taken on the line 21—21 of Figure 1, In the drawings, 25 and 25$^a$ represent the main frame members of the machine, which may be of any suitable construction and supported in any suitable manner, as by posts 26, 27 and 28, connected by cross girders 29 and 29$^a$, longitudinal floor members 30 and 30$^a$, and intermediate horizontal beams 31 and 31$^a$.

*The label feeding device.*

Although a single label feeding magazine is operable, I prefer, for the purpose of speed and rapidity of operation and in combination with the above enumerated means for augmenting the capacity of the machine, to provide a series of magazines, preferably four, acting as a unit to feed the labels with the required rapidity without materially increasing the speed of rotation.

Referring now also to Figures 1, 2, 5, 7 and 9, two quadruple sets of crank arms 32 and 32$^a$ of exactly the same length are mounted in bearings, preferably on a frame 33, secured to the beams 31 and 31$^a$. The arms 32 are provided with a stub shaft 34 journaled in bearings 35 and the arms 32$^a$ with a shaft 34$^a$ journaled in bearings 36 and 37. The shaft 34$^a$ carries a driving sprocket 38 and the bearings 35 and 37 are preferably provided with adjusting screws 39 and 40 for the purpose of a proper lateral adjustment of the label magazines 41. The shafts 34 and 34$^a$ are offset a certain distance horizontally, as shown most clearly in Figure 7, and the label magazines are carried on pins or studs 42 and 42$^a$ fastened to the opposite ends of the arms 32 and 32$^a$ respectively, and journaled in bearing blocks 43 and 43$^a$, secured to or cast integral with the bottom plate 44 of the magazine 41, the centers of the journals 43 and 43$^a$ being exactly spaced the same distance apart horizontally as the center of the shafts 34 and 34$^a$. When, therefore, the arms 32$^a$ are rotated through power applied to the sprocket 38, equal rotation is imparted to the arms 32 and the magazines 41 will be carried in a planetary movement around a point midway between the shaft 34 and 34$^a$ and will always be held in an exact horizontal plane. The construction and operation of each of the magazines are identically the same and the illustration and following description of one will therefore suffice for all four.

The magazines 41 consist of side walls 45 and 45$^a$ hinged at 46 and 46$^a$ to the raised end portions 47 of the bottom plate 44, the wall 45$^a$ being bent to form the end sections 48 normally abutting the wall 45. Spring catches 49 are secured to the end sections 48 and have holes through which pass locking pins 50 secured to the side wall 45 and finger ends 49$^a$ project from the catches 49 by which the catches may be removed from the pins 50 when it is desired to open the magazine. The side walls 45 and 45ª are spaced apart slightly more than the width of the labels 52 and a narrow thin inwardly turned flange 53 is provided in both walls at their upper edges against which the labels are normally held, as shown in Figure 10, by the force of a suitable helical spring 54. The labels are placed and supported on a rectangular follower 55, preferably resting on a plate 56 and loosely fitting within the magazine. The helical spring 54 bears against the plate 56 and the bottom plate 44 and is proportioned to be compressed within the space formed by the raised end portions 47 and to exert a substantially constant and light pressure of the labels against the flanges 53, irrespective of the number of labels stacked in the magazine. It is desirable to momentarily drop the stack of labels away from the upper label when said label is removed from the stack, for reasons which will be hereinafter explained, and I therefore provide the following means to this end. A depending sleeve 57 is attached centrally to the bottom plate 44 and a rod 58 connected to the plate 56 slidably passes through this sleeve. A slot 59 is provided in the sleeve through which a pin 60, fastened to the rod 58, projects. This pin serves to prevent the rod 58 from turning in the sleeve and is also used for a handle to manually operate the rod.

A series of ratchet teeth 61, operable through a slot 57ª in the sleeve 57, by a pawl 62, are cut in the rod 58, the pawl being carried by a cam lever 63, pivoted at 64 to a lug at the bottom plate 44 and a spring 65 holding the pawl in engagement with the ratchet teeth 61 and also holding the short end of the lever in contact with a cam 66. This cam is secured to or formed on the crank arm pin 42ª, and as the crank arm rotates, the pin 42ª and cam 66 will rotate with respect to the cam lever 63 and at a predetermined point in the revolution will raise the short follower end of the lever 63 and depress the pawl 62, which will engage the ratchet teeth 61 and depress the rod 58 against the tension of the spring 54. This action will lower the stack of labels, as shown in Figure 8, until the cam 66 has passed the follower end of the lever 63, when the pressure of the spring 54 will automatically raise the labels to the position shown in Figure 10 and the pawl 62 will be released from the ratchet teeth 61 by engaging the sleeve 57 at the upper terminal of the slot 57ª, as shown in Figure 9, which permits the stack of labels to be gradually raised as the labels are removed one by one from the top of the stack.

During the period while the magazine travels in a short arc in the upper portion of its orbit, the upper label comes in contact with an endless belt 67 traveling in the same direction and at the same rate of speed. This belt is carried by pulleys 68 and 69 having shafts 68ª and 69ª mounted in suitable bearings on the frame members 25 and 25ª.

Between the pulleys 68 and 69 is arranged a vacuum chamber 72, supported by brackets 73 from the frame members 25 and 25ª, the lower wall of the chamber being formed by the belt 67 and the side walls 74 and 74ª and end walls 75 and 75ª forming substantially air-tight connections 76 with the belt 67. A series of perforations 77 arranged preferably in four rows, as shown in Figures 8 and 10, are formed in the belt 67 through which air is continuously drawn into the chamber 72 in the lower portion of the belt and exhausted through a pipe 78 by means of a suitable fan 79 driven by a motor 79ª. When the upper label in the magazine is forced against the under surface of the belt 67 during the passage of the magazines through the upper arc of its orbit, and the magazine makes air-tight connection with the belt 67, a partial vacuum is formed in the chamber 72, causing the label to adhere to the belt and be carried off therewith and just at the moment of its adhesion to the belt, the remaining labels are dropped away, as above described, to prevent dislocation by friction of the remaining labels as the upper label is drawn away by the belt 67. A series of openings 80 are provided in the walls of the magazine just below the flanges 53 to prevent a partial vacuum being formed in the magazine and attracting the labels when they are lowered and before the magazine sufficiently retracts from the belt to admit air above the magazine. These openings also prevent the forming of a vacuum in the magazine and the lifting of the labels to the belt when for any practical reason it is desired to run the magazines without feeding the labels to the label carrying device of the machine. For this purpose the label stack may be lowered manually by means of the pin handle 60 and locked in this position by turning the pin under the lower end of the sleeve, as indicated by dotted lines in Figure 8.

*The label carrying and controlling device.*

The main label carrying wheel 82 is mounted on a shaft 83 journaled in bearings 84 and 84ª on the frame members 25 and 25ª (Figure 6). This wheel is preferably composed of a hub 85, spokes 86, internal rim 87, upon which is preferably wood lagging 88 surrounded by a layer 89 of felt or similar material. A series of cords 90, 90ª and 90ᵇ, preferably three of the former and four of the latter, as shown in Figures 1 to 6, and spaced as shown particularly in Figures 3 and 6, encircle the wheel 82. The labels pass outside of the cords 90, and under the cords 90ª and 90ᵇ, as will hereinafter be more specifically described, the three cords 90 under the labels passing from the wheel 82 under a movable roller 91 (see Figures 1, 2, 12 and 21) and away from the wheel over grooved rollers 92 or sheaves upon a shaft 92ª, thence around sheaves 93 upon weighted sheave carriers 94 having rods 94ª slidable in guides 95 attached to the frame member and upwards over a grooved roller 96. From this roller the cords run backwards to the wheel 82, under the belt 67 and over sheaves 97 attached to a rotating spindle 97ª having bearings in the frame, and thence to the wheel 82. The four cords 90ª and 90ᵇ above the labels pass from the wheel 82 under a roller 98, thence two of them, 90ª, over the small sheaves 99 mounted upon a frame plate 100 (see Figures 1, 2 and 13) and downwards over the loosely running sheaves 101 upon the spindle 97ª around the weighted sheaves 102 and up over the loosely running sheaves 103 upon the spindle 97ª and back to the wheel 82. The other two cords 90ᵇ follow the same course, but to allow for proper spacing and clearance pass over the larger sheaves 105 back to the wheel 82. As shown in Figure 3, the cords are spaced uniformly across the face of the wheel, the under cords 90 being located between the upper cords 90ª and 90ᵇ. The rollers 97 over which the cords 90 pass move together with the spindle 97ª, but the sheaves 101 and 103 over which the cords 90ª and 90ᵇ run move individually upon the spindle 97ª.

In feeding the labels from the magazine to the belt, as heretofore described, the labels will be drawn to the surface of the belt between the cords, which are of extremely small size and of strong material. The labels will then be carried from the magazine by the belt, held by the suction in the vacuum chamber 72 with the cords 90 between the belt and the label, as shown in Figure 12, until the forward end of the label, being relieved from the suction after passing from under the vacuum chamber 72, is caught between cords 90 on the upper side and the rollers 97 over which the cords 90 run, and cords 90ª, 90ᵇ slightly grooved in the sheaves 103 on the under side of the label, as clearly shown in Figures 4 and 13. As the front end of the label is thus caught before the rear end is relieved from the suction pressure in the vacuum chamber, and as the label passes from the roller immediately onto the wheel 82 between the cords 90 and 90ª, 90ᵇ there is no possibility of a slippage or displacing of the label at this point. As it is carried around the felted rim of the wheel 82, in the direction of the arrow in Figure 1, it is firmly gripped between the two sets of cords and the felt, the weighted sleeves 102 and 105 keeping the tension on the cords uniform. The axle of the wheel 82, the rollers 97, sheaves 103 and pulley 68, being adjusted in perfect alinement, the labels, as they enter the wheel 82 between the cords 90 and 90ª, 90ᵇ will be moved in a true line onto the wheel and can not be displaced during their travel around the wheel in preparation for attachment to the cans.

*The label preparing devices.*

Around the lower section of the wheel 82, I arrange a spraying and heating device for thoroughly impregnating with a fluid preferably water heated to near the boiling point, the body of the labels including the colored and printed matter usually found on one side of the labels. As the labels enter the wheel with this side towards the wheel, the spray of heated fluid is directed towards the opposite or pure paper side of the labels, from which side it quickly soaks through the paper and heats and tempers the entire body of the label. The spraying device preferably consists of a number of coiled pipes 108, (see Figures 1 and 6) bent to the curvature of the rim of the wheel 82 and provided with a multiplicity of very small apertures or jets directed in the general direction of the label carrying wheel 82. A supply pipe 110 leading from a boiler (not shown) is attached to one or both of the manifolds 111 and 111ª to which the upper ends of the pipes 108 are connected.

A hopper 112 is arranged around the spraying pipes 108 to collect the water dropping from the wheel 82 and a drain pipe 113 is connected to the bottom of the hopper through which the water may be pumped back to the boiler. Above the rear end of the hopper 112 is arranged a wringer roller 114, preferably covered with felt and journaled in yoked arms 115 pivoted to the frame brackets 116 at 117. A tension spring 118 is attached to the yoke of the arms 115 and to a threaded eye bolt 119 slidable through a frame bracket 120 and having a thumb nut 121 by which the pressure of the wringer roller 114 against the face of the wheel 82 may be adjusted. After the labels have been subjected to the spray and thoroughly heated and soaked they pass under the wringer roller 114, the pressure of which removes the superfluous moisture from the labels before they pass to the paste applying device. This device consists of a tray or container 119ª Figure 1 to which the paste or adhesive material is supplied by a pipe 120ª and a rotating segmental roller brush 121ª, dipping into the paste in the tray and contacting the labels on the wheel 82 as they pass. In order to avoid applying paste to the face of the wheel in the spaces between the passing labels 52, the brushes are omitted on a segment 122 of the roller and the free space thus provided in the brush circumference of the roller is timed, in the operation of the machine, to coincide in its passage of the wheel with the space X (see Figures 3 and 6) between the labels carried by the wheel 82, while the brush 121ª registers and contacts with a label 52 at each revolution of the brush, and applies a uniform layer of paste to each label as they pass on the wheel 82. The level of the paste in the tray 119ª is kept at a constant regulated level by means of an overflow pipe 123, preferably threaded in the bottom of the tray which may be raised or lowered and which discharges the overflow into a hoppered pipe 124 from which it is returned to the supply pipe 120ª by a suitable pump (not shown). In practice with a battery of machines in operation a single pump supplies the paste to the machines through a common supply pipe or trough 125, from which the branch pipes 120ª, preferably having stop off valves 120ᵇ discharge the paste into each individual tray, from which the overflow branch pipes 123 discharge the surplus into a common surplus pipe 126 which returns it to the pump. In the application of the paste to the labels which are firmly held on the wheel 82 by the cords 90 and 90ª, the brush 121ª moves in the opposite direction on the surface of the labels to that in which the labels are moving and the wiping or brushing contact of the brush 121ª with the label surface has the effect of applying a thin uniformly spread out coat of paste to the labels.

By reason of the heated labels the paste employed can have added fluidity or leanness, because when it is applied to the labels their heat quickly evaporates the superfluous moisture and renders the paste increasingly adhesive and quick setting.

*The label affixing and can feeding mechanism.*

This is composed in general of two cooperating affixing disc units mounted adjacent the face of the wheel 82 with their axes parallel thereto, both units rotating in the same direction but at a faster surface speed than the face of the wheel 82 between which and the aforesaid discs the can is rolled as the label is attached. The upper affixing unit consists of discs 127 and 127ª mounted on a shaft 128, journaled in bearings 129 and 129ª on vertical frame brackets 130 and 130ª attached to the main frame of the machine. Circular faced ledges 131 and 131ª, integral with the discs 127 and 127ª project inwards therefrom forming outer flanges 132 of the discs between which the cans 133 are received through an opening 134 from an inclined open chute 135, each can, as it drops between the flanges, resting on the circular ledges 131 and 131ª and against the cross plate 135ª forming the terminal of the chute 135. To this plate is attached or formed integral therewith a guide strip 136, curved forward over the shaft 128 and backwards below said shaft. Guide strips 137, conforming to the same general curvature, following the periphery of the discs 127 and 127ª and spaced from the shaft 128 for freely passing a can between them and the guide strip 136 are secured to the under side of the chute 135. Slots or recesses 138, Figure 13, are formed in the circular ledges 131 and 131ª and as the discs are rotated the can resting on the ledges will drop into the recesses 138 and be carried around by the walls of the recesses guided by the strips 136 and 137 as shown in Figure 1 and is then discharged from the upper attaching unit onto the circular ledges 139 and 139ª of the lower disc unit. The construction of this unit is substantially identical with the upper unit and consists of the shaft 140 upon which the discs 141 and 141ª are mounted, suitable bearings 142 and 142ª for the shaft 140, the ledges 139 and 139ª projecting from the discs 141 and 141ª respectively and the slots or recesses 143 through the ledges adapted to receive and carry a can and discharge it upon an inclined runway 144 leading from the shaft 140 away from the machine.

The space between the circular ledges of the affixing units as herebefore described and the face of the wheel 82 is adjusted so that when a can from the upper unit is dropped on the ledge of the lower unit, the ledge on the upper unit in passing will carry the can against the face of the wheel 82 and force it tightly against the felt of the wheel. In this position it will be rolled between the three contact points of the two disc units and wheel, as shown clearly in Figure 12, but as herebefore explained the surface speed of the hard circular ledges upon which the can rolls being greater than the surface speed of the softer felt covering of the wheel, the can will naturally slip on the felt surface of the wheel.

In the operation of affixing the label, as the label, prepared and provided with a thin coat of paste arrives at the cord roller 98, the outer cords 90ª pass from the wheel 82 and label 52 by passing upwards around the roller and over the various sheaves back to the wheel 82 below the label feeding device as heretofore described.

Before the upper cords release the label, its forward end encounters the revolving can, timed to arrive at this point slightly in advance of the label, and the label is caught between the can and the felted face of the wheel 82. The cords 90 still under the label, at this point leave the wheel to pass under the roller 91 and thereby the cords 90 will partly encircle the can 133, stripping the label from the wheel 82 and carry it partially around the can. This action is a very important feature of the invention as it insures the initial curvature and attachment of the forward end of the label to the can, the label with its adhesive or pasted side being firmly held against the can by the cords for a considerable portion of the circumference of the revolving can until the label has been entirely affixed to the circumference of the can. Just before this point is reached the roller 91 is swung inwards towards the wheel 82 to the position shown in Figure 13 to permit of the can entering the recess 143 of the lower affixing unit after the can has rolled slightly more than one revolution and the label has been completely attached.

In order to prevent wrinkling in the overlapping of the label by its end, due to the differential or wiping action of the can rolling ledges when these touch the label, I relieve the pressure on the overlapping label at this point where there are two thicknesses of label material by slightly undercutting the circular face of the ledges at their terminating points as shown at 139$^b$. I prefer to provide means for positively forcing the can into the recess 143 to insure certainty and rapidity of operation. For this purpose a bar or rocker shaft 145 (see Figures 13 and 14 is mounted in suitable bearings in the frame bracket 130$^a$ and rods 146 and 146$^a$ having inwardly turned fingers 147 are attached to this shaft. These fingers project over the ends of the can as it revolves between the affixing disc units and wheel 82 and are held in this raised position by a coiled spring 145$^a$ holding the rods 146 and 146$^a$ against the hub of the disc. A third rod 148 is attached to the rocker shaft 145 adjacent the disc 127 and a pin 148$^a$ on the disc is positioned to engage this rod at the proper moment, swing the rods to the position shown in Figure 14, the fingers 147 striking the can and forcing it into the recess 143 from which it is discharged upon the runway 144 by the further rotation of the discs 142 and 142$^a$. The swinging roller 91. as heretofore described, is mounted upon arms 149 attached to a shaft 150 and is operated in proper sequence by a cam 151 carried by the disc 142 and engaged by an arm 152 fastened to the shaft 150 and held against the face of the cam 151 by a spring 152$^a$ as shown most clearly in Figure 19.

*The drive and automatic stop mechanism.*

Referring now to Figures 15 to 19 inclusive, of the drawings, it will be noted that the motor, driving the fan 79 through a shaft 153, also drives a shaft 154 through a suitable worm and wheel reduction gearing 155 not shown in detail, but preferably mounted above the machine on the frame bracket 130$^a$. A sprocket wheel 156 on the shaft 154 drives, by means of a chain 156$^a$, a somewhat larger sprocket wheel 157 loosely mounted upon the upper disc unit shaft 128 which is the main driving shaft of the machine. Upon the opposite end of this shaft (see Figures 5 and 20) which illustrates in diagrammatical form the proportional pitch line diameters of the driving gears and sprocket wheels, is secured a gear 158 in mesh with an idler gear 159 which in turn meshes with a larger gear wheel 160, which is keyed to the axis 83 of the wheel 82. The gear 160 operates the paste brush 121$^a$ through a gear 161 on the brush roller shaft 162 and an intermediate idler gear 163 mounted on the bracket casting 164$^a$ in which also the shaft 162 is journaled. The main driving shaft 128 also carries a sprocket 164 which drives the front part of the machine through a chain 165 running partially around a sprocket 166 on the shaft 140 of the lower affixing unit, thence around an idler adjusting sprocket 167 and under a second idler sprocket 168, partially around a large sprocket wheel 169 upon the label magazine operating shaft 34$^a$ and around a sprocket 170 on the pulley shaft 69$^a$ back to the sprocket 164.

It will be understood that for every revolution of the affixing unit discs a can is fed thereto and a label is fed to the carrying wheel 82. The ratio of the gearing must therefor as shown be four revolutions of the affixing discs and paste brush for one of the label magazine driving shaft 34$^a$. The speed ratio of the carrying wheel to the affixing discs will depend on the size of the wheel but is shown in drawings as being one to ten. By reference to the diagrammatical view of Figure 20 it will be noted that the surface speed of the affixing discs 127 and 127$^a$ and 142 and 142$^a$ are considerably greater than the surface speed of the wheel 82 by reason of the greater ratio shown between the pitch diameter of the gear 158 and surface of the can rolling discs than between the pitch diameter of the gear 160 and periphery of the wheel 82. the ratio of speed between the rolling faces of the disc and the periphery of the wheel being shown to be about 5½ to 4.

In order to save time, and prevent waste of material by the accidental clogging of the machine with labels when the supply of cans to the label affixing mechanism should for any reason be interrupted, I provide the following means for automatically stopping the machine when the supply of cans runs out, and for restarting it when the cans are again supplied to the machine.

A shaft or spindle 171 is mounted in the frame bracket. To this spindle is secured a light follower arm 172 normally resting on the incoming cans 133 as they roll inwards on the chute 135 under the guide strips 172ª. The spindle 172 on the driving side extends out beyond the bracket 130ª as shown in Figure 17 and is provided with a counter balanced arm or lever 173, having link connections 174 to a dog 175. This dog is pivoted at 176 on a pin 178 slidably mounted in a housing 179 attached to the frame bracket 130ª, the pivot pin 176 projecting through a slot 180 in the housing and the dog having a projection 175ª adapted to bear against the link 174. A jaw clutch sleeve 181 is slidingly splined to the driving shaft 128 and is provided with an annular groove 182 which is engaged by a forked lever 183. This lever is pivoted to the frame at 184 and a tension coil spring 185 tends to force the clutch sleeve outwards and in engagement with the driving clutch member 186 which is mounted on a reduced portion of the shaft 128 and which normally is driven by the sprocket wheel 157 and turns therewith, being rotatably held upon the shaft against lateral movement by a collar 187 and a shoulder 188. The sliding clutch sleeve 181 has a cam flange 189 in which is formed a recess 190 as shown more particularly in Figure 16 and when the pin 178 drops in this recess the rotating clutch member 181 is forced out of engagement with the clutch member 186 as illustrated in Figure 17.

As long as the cans 133 are present in the feed chute 135, the pin 178 is held in an elevated position as shown in Figure 18 by the follower arm 172 resting on a can, through the lever and link connection 173 and 174 with the dog 175. Before the last of the cans run out however, the follower arm drops and the pin 178 then resting on the flange 189, will drop into the recess 190 as the clutch revolves, and the clutch will be disengaged as shown in Figure 17. As the pin 178 comes to the limit of its drop, the weight of the follower arm 172 will swing the depending arm of the dog 175 outwards to an inclined position as shown in full lines in Figure 15 and in this position it will be out of the path of a cam 192 that is formed on the periphery of the driving clutch member 186. As soon however as fresh cans roll under the inclined end of the follower arm 172, the arm will be raised sufficiently to swing the dog 175 back to the vertical position and the dog still being in the lowered position will be raised by the rotating cam 192 as shown in Figure 18 thereby also raising the pin 178 from the recess 190 and permitting the clutch sleeve 181 to be drawn by the spring 185 in mesh with the driving clutch member 186 thus again automatically starting the machine. The cam 192 also raises the follower arm 172 slightly above the cans but as the arm drops and comes to a rest on the cans after the cam 192 has passed the dog 175, this dog will be swung out of the path of the cam as shown in dotted lines in Figures 15 and 18.

I prefer to interpose a safety slipping device between the sprocket wheel 157 and clutch member 186. To this end a hexagon nut or collar 193 is arranged on the hub of the driving clutch member 186 between which and a flange 194 the sprocket wheel 157 is loosely mounted. An arm 195 is pivotally connected to the sprocket 157 at 195ª as shown in Figure 19 and is normally forced against one of the sides of the hexagon collar by means of a coil compression spring 196 arranged between a lug 197 projecting from the side of the sprocket 157, and a collar 198 upon a rod 199 connected to the arm 194. When the machine is running normally, the pressure of the arm 195 against a flat side of the nut 198 and the resistance of the corners of the hexagon sides is sufficient to drive the machine but in case of an abnormal resistance in any part of the machine the spring 196 will compress and the arm 195 will slip around the hexagon nut 193 without driving the machine.

I claim as my invention:

1. Mechanism for affixing labels to containers, comprising, in combination, a rotatable label carrying drum, means for feeding labels to said carrier, means for applying adhesive material to said labels while supported by said carrier, means for moving the label, while supported by said carrier, into contact with the containers to be labeled, and means for rotating the container while in contact with the label and thereby wrapping the label around the container.

2. Mechanism for affixing labels to containers, comprising, in combination, a rotatable label carrier, means for feeding labels to said carrier, means for applying adhesive material to said labels while supported by said carrier, means for moving the label, while supported by said carrier, into contact with the containers to be labeled, and means for rotating the container, while in contact with the label, at a surface speed greater than the speed of the label.

3. Mechanism for affixing labels to containers, comprising, in combination, a rotatable label carrying drum, means for feeding labels to said drum, means for applying adhesive material to said labels while supported by said drum, means for moving the label, while supported by said drum, into contact with the container to be labeled, and means for rotating the container while in contact with the label, and thereby wrapping the label around the container.

4. Mechanism for affixing labels to containers, comprising, in combination, a rotatable label carrying drum, means for feeding labels to said drum, means for applying adhesive material to said labels while supported by said drum, means for moving the label, while supported by said drum, into contact with the container to be labeled, and means for rotating the container while in contact with the label, at a surface speed greater than the speed of the label.

5. Means for affixing labels to containers, comprising, in combination, a rotatable label carrier, means for feeding labels to said carrier, means for wetting the labels and applying adhesive material thereto, while supported by said carrier, means for moving the label while supported by said carrier, into contact with the container to be labeled, and means for rotating the container while in contact with the label and thereby wrapping the label around the container.

6. Means for affixing labels to containers, comprising, in combination, a rotatable label carrier, means for feeding labels to said carrier, means for wetting the labels and applying adhesive material thereto while supported by said carrier, means for moving the label while supported by said carrier into contact with the container to be labeled, and means for rotating the container while in contact with the label at a surface speed greater than the speed of the label.

7. Mechanism for affixing labels to containers, comprising, in combination, a rotatable label carrying drum, means for feeding labels to said drum, means for wetting the labels and applying adhesive material thereto while supported by said drum, means for moving the label, while supported by said drum, into contact with the container to be labeled, and means for rotating the container while in contact with the label and thereby wrapping the label around the container.

8. Mechanism for affixing labels to containers, comprising, in combination, a rotatable label carrying drum, means for feeding labels to said drum, means for wetting the labels and supplying adhesive material thereto while supported by said drum, means for moving the label, while supported by said drum, into contact with the container to be labeled, and means for rotating the container while in contact with the label at a surface speed greater than the speed of the label.

9. The combination, in a machine of the class described, with a rotating label carrying drum, of means for feeding labels thereto, means for wetting the surface of the labels, and means for bringing one face of the label, while its other face is in engagement with said drum, into contact with the surface of the container to which the label is to be applied.

10. The combination, in a machine of the class described, with a rotating label carrying drum, of means for feeding labels thereto, means for wetting the labels, and means for applying adhesive material to one face of the label while carried by said drum, means for bringing the adhesive material carrying face of the label into contact with the surface of the container, while the other face of the label is in engagement with the drum.

11. The combination, in a machine of the class described, with a rotating label carrying drum, of means for feeding labels thereto, means for wetting the labels, means for applying adhesive material to one face of the label, means for bringing the adhesive material carrying face of the label into contact with the surface of the container to which the label is to be affixed, while the other face of the label is in engagement with the drum, and means for rotating said container to wrap the label around the container, and remove it from the drum.

12. The combination, with an imperforate rotating label carrying drum, of means for feeding labels thereto, means for wetting the labels with a suitable liquid, means for holding the labels on said drum during the wetting operation, and means for feeding cylindrical containers into contact with said labels while they are being moved by said drum.

13. The combination, with a rotating label carrying drum, of means for feeding labels thereto, means for wetting the surface of the labels with a suitable fluid, means for holding the labels on said drum, means for feeding cylindrical containers into the path of the labels while they are being moved by said drum and means for rotating said containers to wrap said labels around the containers while removing them from said drum.

14. The combination, with a rotating label drum, of means for feeding labels thereto, means for wetting the surface of the labels, means for holding said labels on said drum during the wetting operation, means for feeding cylindrical containers into the path of the labels, and means for rotating said containers at a surface speed greater than the surface speed of said drum and thereby wrapping said labels about said containers and simultaneously removing them from the drum.

15. The combination, with a rotating label carrier and means for feeding labels thereto, of means encircling said carrier for holding the labels said encircling means passing both under and over said labels, and means for wetting a surface of the labels.

16. The combination, with a rotating label carrier and means for feeding labels thereto, of flexible means encircling said carrier and passing both under and over the labels for engaging and holding the labels thereon, and means for wetting the surface of the labels while so held.

17. The combination, with a rotating label carrier, of means for feeding labels thereto, means extending around said carrier and arranged upon opposite sides of the labels for holding them on said carrier, and means for wetting the surface of the labels.

18. The combination, with a rotating label carrier, of means for feeding labels thereto, flexible means encircling said carrier and passing under and outside of said labels and holding them on the face of the carrier, and means for wetting a surface of the labels.

19. The combination, with a rotating label carrying drum, of means for feeding labels thereto, means encircling said drum for holding the labels thereon, means for wetting a surface of the labels, means for delivering cylindrical containers into the path of the labels while they are held by said drum, and means for rotating said containers at a surface speed greater than the surface speed of said labels.

20. The combination, with a rotating label carrier, of means for feeding labels thereto, endless label holders passing around said carrier and traveling therewith, means for feeding labels between said label holders, means for wetting said labels, and means for applying adhesive material to the outer faces of the labels.

21. The combination, with a rotating drum, of means for feeding labels thereto, flexible label holders passing around said drum and traveling therewith, some of said label holders being positioned on one side of said labels and some on the opposite side and means for wetting said labels and applying paste to the outer surface thereof, while said labels are being moved by said carrier.

22. The combination, with a rotating label carrier, of a label holder encircling said carrier near its middle portion, label holders encircling said carrier on opposite sides of said first named label holder, means for feeding labels with their middle portions on the outer side of said first named label holder and their edges between said other label holders and said carrier, means for wetting said labels, and means for applying paste thereto, while said labels are held upon and being moved by said carrier.

23. The combination, with a rotating label carrier, of a centrally arranged endless label holder encircling said carrier, outer label holders, also endless, encircling the ends of said carrier on opposite sides of said centrally arranged label holder, means for feeding labels over said central label holder and under said outer label holder, means for wetting said labels, and means for applying paste to the outer surface thereof, while said labels are held upon and are being moved by said carrier.

24. The combination, with a rotating label carrier and a wetting device adjacent thereto, of a plurality of label holders encircling said carrier means for feeding labels between said label holders to be held thereby during the label wetting operation and means for applying paste to the outer surface of the labels, after they have been wet, and while they are held on said carrier.

25. The combination, with a rotating label carrier and a wetting device adjacent thereto, of a plurality of label holders encircling said carrier, means for feeding labels between said label holders to be held thereby during the label wetting operation, means for feeding cylindrical containers into contact with said labels while they are held upon and being moved forward by said carrier, and means for rotating said containers while in contact with said labels.

26. In a machine of the class described, the combination, with a plurality of label holders, of means for feeding labels between said label holders, means for deflecting from said labels the label holders that contact with the outer side thereof while the labels remain in contact with the inner label holders, and means for bringing containers into contact with said labels as they are being moved with said inner label holders.

27. In a machine of the class described, the combination, with a plurality of label holders, between which said labels are moved, means for wetting and applying adhesive material to said labels while in contact with said label holders, means for directing the outer set of said label holders away from said labels, and means for bringing containers into contact with said labels at a point where they are being held by the inner set of said label holders.

28. In a machine of the class described, the combination, with a plurality of label holders between which said labels are moved, means for wetting and applying adhesive material to said labels while in contact with said label holders, means for directing the outer set of label holders away from said labels, means for bringing cylindrical containers into contact with said labels at a point where they are in contact with the other label holders, and means for rotating said containers while in contact with said labels at a greater surface speed than the rate of travel of said labels.

29. In a machine of the class described, the combination with a plurality of label holders, between which said labels are moved, means for wetting and applying adhesive material to said labels while in contact with said label holders, means for directing one set of said label holders away from said labels, and means for bringing containers into contact with said labels at a point where they are being held by the outer set of said label holders, means for rotating said containers at a surface speed greater than the rate of travel of said holders.

30. The combination, with a label wetting device, of a rotating carrier, cords passing around said carrier, and moving therewith, means for feeding labels between said cords and carrier, and means for applying uniform tension to said cords for holding said labels in contact with said carrier during the wetting operation.

31. The combination, with a rotating carrier, of a label moistening device adjacent thereto, a series of cords passing around said carrier, means for feeding labels to said carrier and said cords, each label while supported by said carrier being on the outer side of certain of said cords, and under the other cords.

32. The combination, with a rotating carrier and means for feeding labels thereto, of means for moistening the surface of the labels, cords encircling said carrier, some of the cords being on one side of the labels and other cords on the opposite side for holding the labels on the carrier, means for deflecting the outer cords away from the carrier and labels, and means for bringing containers into contact with the labels while they are moving with the inner cords and carrier.

33. The combination, with a rotating carrier, of a label wetting and heating device, flexible label holders passing around said carrier, means for feeding labels to said holders and carrier, means for bringing cylindrical containers into contact with the labels while they are moving with the carrier, and means for directing a portion of the label holders away from said carrier and thereby leading the labels partially around said containers.

34. The combination, with a rotating label carrier and means for feeding the labels thereto, of means for wetting the labels with a suitable fluid, means for feeding cylindrical containers into the path of the labels and rotating them, and means for stopping the machine automatically when the supply of containers is exhausted.

35. The combination, with a rotating label carrier and means for feeding the labels thereto, of means for wetting the labels with a suitable fluid, means for feeding cylindrical containers into the path of the labels and rotating them, means for stopping the machine automatically when the supply of containers is exhausted, and means for starting the machine again automatically when containers are again delivered thereto.

36. The combination, with a rotating label carrier, and means for feeding labels thereto, of means for holding the labels on the carrier, means for delivering cylindrical containers into the path of the labels while they are being moved by said carrier and means arranged to prevent the wrinkling of the overlapping ends of the labels on the container.

37. The combination, with a rotating label carrier and means for delivering labels thereto, of means encircling the carrier for holding the labels thereon, means for delivering cylindrical containers into the path of the labels while they are being moved by said carrier, discs having ledges and slots adapted to receive and discharge the container, and said ledges having undercut faces for relieving the pressure on the overlapping label.

38. The combination, with a rotating label carrier and means for delivering labels thereto, of means encircling the carrier for holding the label thereon, means for delivering cylindrical containers into the path of the labels while they are being moved by the carrier, said label holders being mounted to partially encircle the foremost container, and strip the label from the carrier and carry it partially around the container and means for revolving the container at a surface speed greater than the surface speed of the labels.

39. The combination, with a rotating carrier and means for feeding labels thereto, of means for holding labels on the carrier, means for delivering cylindrical containers into the path of the labels while they are being moved by the carrier and revolving the container during the operation of affixing the label thereto, and means for positively moving the container to its discharging position when the label has been affixed.

40. Mechanism for affixing labels to cylindrical containers comprising in combination, means for delivering the labels to a rotating carrier, means for applying an adhesive material to the surface of the labels, means for rolling the containers and bringing the labels into contact with the containers and means for deflecting the labels from the carrier and directing them upon the rolling container.

In witness whereof, I have hereunto set my hand this 14th day of Sept., 1920.

MORTON F. PHELPS.